Patented Sept. 22, 1925.

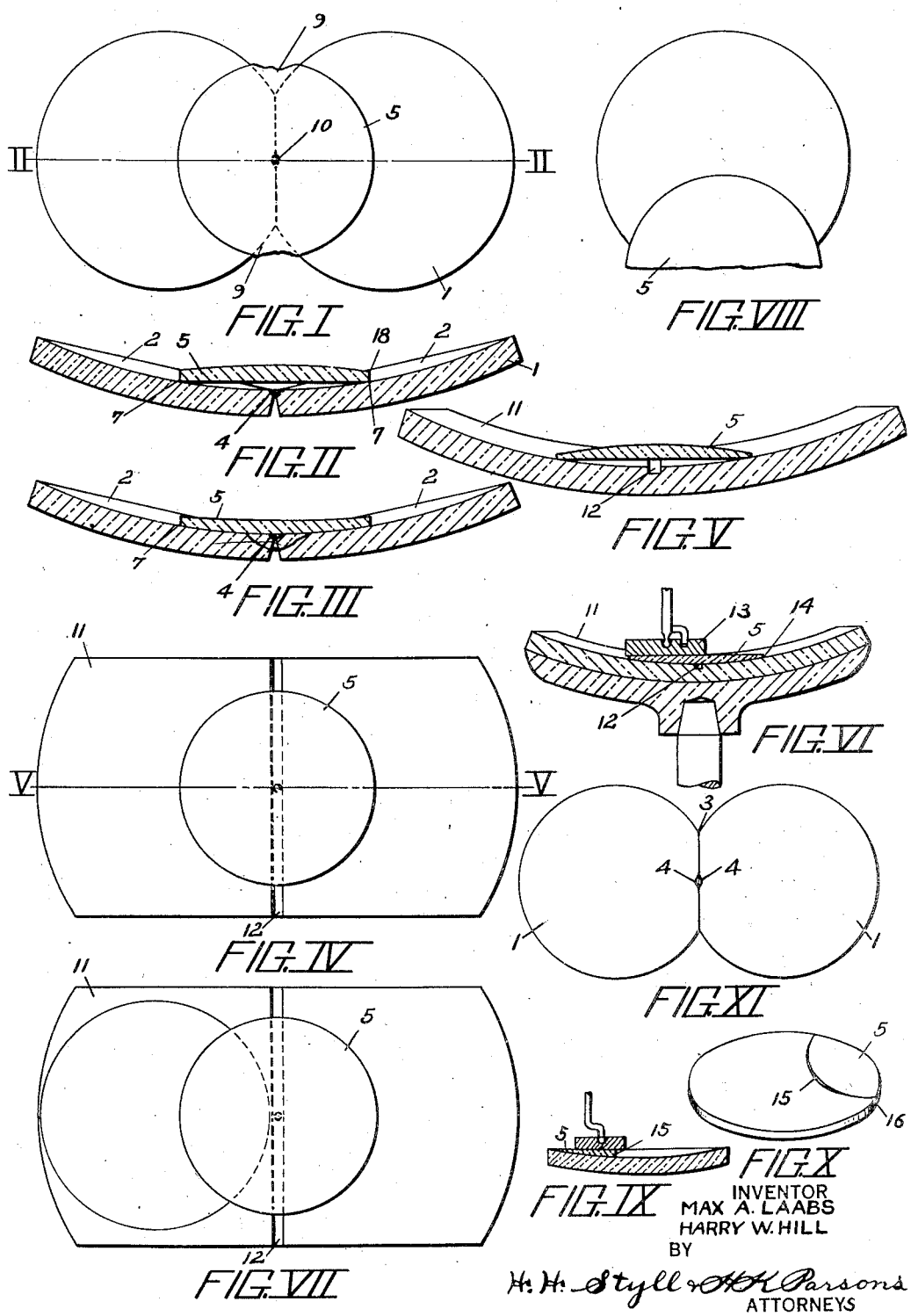

1,554,284

UNITED STATES PATENT OFFICE.

MAX A. LAABS AND HARRY W. HILL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

PROCESS OF PRODUCING LENSES.

Application filed September 19, 1921. Serial No. 501,650.

*To all whom it may concern:*

Be it known that we, MAX A. LAABS and HARRY W. HILL, citizens of the United States, residing at Southbridge, in the county of Worcester and State of Massachusetts, have invented certain new and useful Improvements in Processes of Producing Lenses, of which the following is a specification.

This invention relates to improvements in lenses and has particular reference to a novel and improved construction of bifocal lens and process of producing the same.

One of the principal objects of the present invention is the production of a novel and improved form of bifocal lens formed from two parts of glass in which the segment may be placed on the inner in place of the outer side, and in which the entire lens may be ground extremely thin without danger of damaging the segment or reading portion thereof.

A further object of the present invention is the provision of a lens of this character in which the size and shape of the segment may be largely varied as desired in the initial process of production, and in which wastage of glass in production of the lens is reduced to a minimum.

A further object of the present invention is the provision of an improved process by the use of which a blank for a plurality of lenses of this type may be readily produced in a single operation.

A further object of the present invention is the provision of a novel and improved process of constructing lenses of this character which will greatly simplify their manufacture and reduce the number of steps required and the cost of manufacture of the lens while at the same time producing a more desirable article.

A further object of the invention is the provision of an improved form of two part bifocal lens in which the position of the centers of the distance and reading portions in the finished lens may be readily controlled and in which the lens may be made of either monocentric or bicentric form as may be preferred.

Another object of the invention is the provision of an improved form of blank for producing lenses of this sort which shall be in what may be termed semi-finished condition when put out by the manufacturer, and in which the segment may if desired be left for further grinding so that the prescription grinder may adjust the position of center of the reading portion according to his personal ideas in respect thereto.

Other objects and advantages of the present invention should be readily apparent by reference to the following specification taken in connection with the accompanying drawings, and it will be understood that any modifications in the specific details of construction or steps in production may be made within the scope of the appended claims without departing from or exceeding the spirit of the invention.

Figure I represents a plan view of a completed blank for a pair of lenses before separation.

Figure II represents a sectional view as on the line II—II of Figure I.

Figure III represents a view similar to Figure II but illustrating the completion of the fusing operation.

Figure IV represents a plan view of a one-piece blank.

Figure V represents a sectional view thereof as on the line V—V of Figure IV.

Figure VI represents a sectional view illustrating the grinding of the lens shown in Figure IV.

Figure VII represents a plan view illustrating the cutting out of an individual lens subsequent to grinding.

Figure VIII represents a view of the blank of Figure I split before grinding of the segment.

Figure IX represents a view of a method of grinding which may be employed to advantage in connection with the grinding of the blank of Figure VIII.

Figure X represents a perspective view of a monomentric type of bifocal produced from the blank ground as shown in Figure IX.

Figure XI represents a plan view of a pair of blanks such as used in Figure I showing most clearly the centering marks and flat edges molded on the initial blanks.

In the drawings, in which similar characters of reference denote corresponding parts throughout the several views, the numeral 1 designates the base blanks intended to form the distance portions of the bifocal lenses, these blanks having the upper surfaces 2 finished to the desired curve which may for example be a minus 6 curve, this being one standard curve very widely used for the ocular side of meniscus lenses. These blanks, as indicated in Figure XI, are preferably molded with a flattened portion 3 at one side and with a slight notch or nick as at 4, the blanks when being fused being placed with the flat edges in engagement with each other and the nicks corresponding to produce a diamond shaped aperture, as is indicated in Figure XI. The lenses having been finished and placed together as indicated in Figure XI, a large disc or segment portion 5 is then placed resting upon the curves 6, this disc being of circular form so that it will at its outer edge, as at the point 7, peripherally contact with the polished face of the blanks 1. It is to be understood that the blanks 1 are preferably formed from crown glass having a relatively low index of refraction, while the segment is formed from flint glass having a higher index of refraction but a low melting point. The purpose of the low melting point is that the glass may be subjected to a heat insufficient to soften or affect the surface of the blanks 1 so that their polished surfaces will be unaffected but the heat will prove sufficient to soften the member 5 and cause it to drop from the position shown in Figure II to the position shown in Figure III and firmly unite with the surface 2 making the parts integral one with the other.

We have found it of particular advantage in this connection to initially make the member 5 with its under surface flatter than the curve 2 and with its upper surface strongly curved to such a degree that after the softening of the parts the glass will be found to have bent to conform to the lower curve and securely unite therewith and a corresponding flattening of the upper surface will have taken place so that it will have dropped to substantially the curve which is to be subsequently produced thereon, thus minimizing the amount of grinding to be later performed. This also has the advantage that a relatively thin edge is produced as at 18 which satisfactorily bears against the supporting blank and will very readily unite therewith while the heavier center portion will pull itself down into close engagement with the glass. The advantage in mounting lenses on substantially round blanks such as shown in Figure I resides in the fact that there is a space at each side as at 9 where the segment is not supported, leaving an open passage under the segment through which the air can escape so there is no danger of bubbles or the like interfering with the fusing and the parts will fuse one to the other. It is important that the disc 5 be properly positioned on the blanks 1. This is done by making a small drill spot, as at 10, in the disc 5 which is mounted directly over the diamond formed by the nicks 4. It will be understood that any other system of lining up the parts equivalent to this may be employed so long as the disc is centered over the blanks so the final outline of the segment on the blanks will be the same.

In Figures IV and V we have illustrated a slightly different method of forming or uniting the parts. We make use of a single large disc member 11 having the central kerf or groove 12 formed in its finished surface to afford an outlet for the air. This groove is sufficiently narrow but deep, so that the softening segment will come down against the face of the blank 11 but will not close up the groove. A permanent air outlet is thus provided at this point. This form of construction is particularly adapted to be subsequently ground as by the grinding tool 13 of Figure VI before the blank is separated, the grinding being continued until the shoulder at 14 is brought down to within a few thousandths of an inch of the surface of the glass, when the reading portion of the lens is preferably considered finished. It is possible if desired to continue the grinding until the surface is brought even with that of the major blank so that it blends therewith or is brought slightly below the surface of the major blank, but we have found that best results can be produced leaving a shoulder a few thousandths of an inch in height at the dividing line.

While the blanks can be most economically surfaced two at a time and before separation, if preferred the blanks may be first split as is shown by the invidual blank in Figure VIII, and then subsequently ground either substantially parallel with the surface of the disc or reading portion, as shown in Figure VI, or grinding the segment away at an angle, as is indicated in Figure IX, leaving a higher shoulder at 15 than at the lower edge as at the point 16, the advantage of this being that a prismatic effect is introduced counteracting the natural prism of a non-bifocal lens, to the end that the center of the reading portion will be raised toward the geometrical center of the blank and if desired may be so positioned that the lens as an entirety in its finished form will be a monocentric instead of a bicentric bifocal. This may be done either in the original process of manufacture or by the prescription grinder, as may be preferred, in the latter event giving him the possibility of adjusting the centers of the reading addition portions of the lens in accordance with his particular view as to the desirability of their positions. In this way the centers may be adjusted so that they will fall at substantially the same point, a feature of particular advantage when different powers are placed before the two eyes of the patient so that there will be a prismatic balance in the two segments.

While we have referred to the segment and major portion of the blank as being formed from glass having different indices of refraction, such as crown and flint, it is to be understood that our invention is also useful in those instances where both the major and minor portions are the same, or substantially the same index of refraction, although the segment is preferably of a glass having a lower softening point. This advantage resides in the fact that the major portion for a plurality of blanks may be satisfactorily provided with its final surface on the bifocal side, and we may then unite therewith the segment through the heating action and subsequently have it ground and polish the segment only, a much easier proposition in forming a lens of this sort than to have it ground and polish the distance or larger part of the blank in a circular zone or area about the central portion.

We would also call attention to the fact that while we have referred to the parts as being fused together they might in some cases be united by a cement or heat actuated cement and that the heating action may not necessarily be an actual fusion but merely heating to a degree sufficient to cause one of the parts to become soft or tacky so that it will stick to the other without actually becoming melted and permanently unified with the other.

We claim:

1. The process of producing multifocal lenses including forming the major portion for a plurality of lens blanks with a center line witness mark in the form of a cut away portion, providing an air outlet, forming a segment of a different index of refraction with the center point indication, aligning the center point indication of the segment with the witness mark, and uniting the parts by fusion while in said aligned position.

2. The process of producing multifocal lenses including forming the major portion for a plurality of lens blanks with a center line witness mark in the form of a cut away portion, providing an air outlet, forming a segment of a different index of refraction with the center point indication, aligning the center point indication of the segment with the witness mark, uniting the parts by fusion while in said aligned position, and subsequently surfacing the exposed face of the segment.

3. The process of producing multifocal lenses including initially surfacing the bifocal face of the major portion for a plurality of blanks in a single continuous curve, forming the material for a plurality of blanks with a center point indication in the form of a cut away portion providing an air outlet, forming a segment with a center point indication, aligning the center point indication with the cut away portion uniting the parts while in aligned position by fusion, and subsequently finishing the bifocal side of the lens by surfacing the segment to a curve different from the curve previously surfaced on the major portion of the blank.

4. The process of producing multifocal lenses, consisting of putting a finished optical surface on a major blank, forming a vent therein, and fusing a second piece of glass over the said vent.

5. The process of producing multifocal lenses, consisting of placing two pieces of glass in juxtaposition, putting a finished surface over the two pieces of glass, forming a vent between the abutting edges, and fusing a single piece of glass over the abutting edges and vent.

6. The process of producing multifocal lenses, including placing a finished optical surface on a major blank of glass, forming a vent in the major blank, fusing a second piece of glass over the vent, and then grinding and polishing the second piece of glass to a finished optical surface.

7. The process of producing multifocal lenses, consisting in placing two pieces of glass in juxtaposition, forming a finished optical surface over the two pieces of glass, forming a vent between the abutting edges, fusing a single piece of glass over the abutting edges and vent, and finishing the fused piece of glass by placing a finished optical surface thereon.

In testimony whereof we have affixed our signatures.

MAX A. LAABS.
HARRY W. HILL.